May 21, 1957  G. BIXLER ET AL  2,793,069
PIVOTAL TYPE VEHICLE CAB DOOR
Filed March 5, 1956
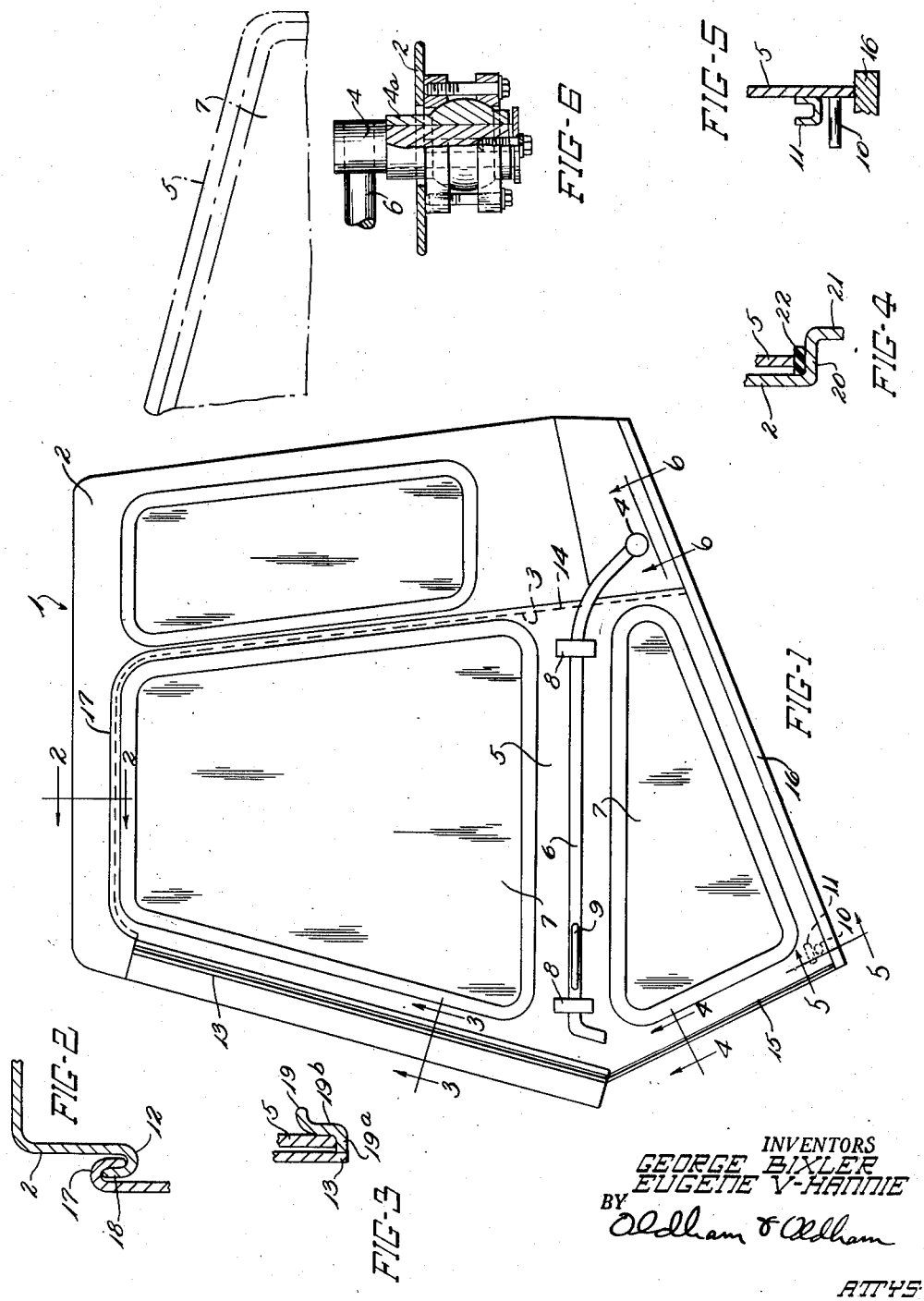
INVENTORS
GEORGE BIXLER
EUGENE V. HANNIE
BY
Oldham & Oldham
ATTYS

United States Patent Office 2,793,069
Patented May 21, 1957

2,793,069

PIVOTAL TYPE VEHICLE CAB DOOR

George Bixler, Kidron, and Eugene V. Hannie, Orrville, Ohio

Application March 5, 1956, Serial No. 569,507

5 Claims. (Cl. 296—44)

This invention relates to door constructions, especially to a type of a pivotal door provided for use with a vehicle cab for closing an access opening therein.

The present invention particularly relates to large types of earth moving equipment such as bulldozers, road scrapers and dirt moving equipment in general. Many of these vehicles are made with some type of an enclosure cab for the operator of the vehicle. Frequently there is only a limited space for access to this vehicle cab, such as would limit door opening action or would prevent the positioning of a conventional type of horizontal swinging door thereon. This is because some portions of the earth moving equipment may be positioned immediately along side of the vehicle cab as space is at a premium in these machines because of the massive operating arms and/or the large motors or engines used on the vehicles.

A further problem which is encountered in vehicles of this type is that they have a rough service life and frequently are subjected to severe abuse in service. The vehicles stand outside in all tyes of weather so that it is highly desirable that the cab be kept both air and weather tight insofar as it is possible so that the vehicle operator can be kept in a maximum degree of comfort.

While pivotal types of windows have been heretofor proposed in certain vehicles, such as hardtop automobiles and other vehicle constructions, no real effective type of a pivotal door has ever been provided, insofar as we are aware, for vehicle cabs of the class described.

The general object of the present invention is to provide a novel type of a door for use with vehicles of the class mentioned and wherein the door is characterized by a pivotal swinging action in a plane lying directly alongside the lateral surface of the vehicle cab.

Another object of the invention is to provide a sturdy door which can readily be moved from operative to inoperative positions and which is held in both positions by gravity.

A further object of the invention is to provide a pivotal type of a door with a relatively uncomplicated construction which has sets of interlocking flanges provided thereon and on the vehicle cab itself to provide a water tight joint when the door is in its closed position.

Another object of the invention is to provide a door for a vehicle cab which door is adapted to have a long service life with a minimum of maintenance thereon and which door will provide the operator with maximum vision and freedom of movement into and within the vehicle cab.

The foregoing and other objects and advantages of the invention will be made more apparent as the specification proceeds.

For a better understanding of the invention, reference now should be had to the accompanying drawings wherein one currently preferred embodiment of the invention is shown in detail, and wherein:

Fig. 1 is a side elevation of a vehicle cab of the type referred to by this invention and indicates the position of the door of the invention in dotted lines, when such door is open;

Figs. 2, 3, 4 and 5 are fragmentary sections taken on lines 2—2, 3—3, 4—4 and 5—5 of the drawings; and Fig. 6 is a section, to a larger scale, taken on lines 6—6 of the drawings.

The present invention, in general, relates to a vehicle which has a cab member that has a vertically extending, flat sidewall with an opening therein, a flat door means, a support shaft pivotally positioned on the cab member and extending substantially normally therefrom on the side thereof to the rear of and at the lower portion of the opening in such sidewall, bar means secured to the door means and carried by the support shaft for positioning the door means for upward and rearward pivotal movement for exposing the opening in the side, control and handle means on the door on the inner surface thereof, and inter-engaging complementary shaped flange means on the door means and the cab adjacent the opening therein for locking engagement when the door is closed to provide a weather and air tight joint for the door.

When referring to corresponding numerals in the specification and in the drawings, they are used for referring to corresponding parts shown in the drawings and described in the specification.

In general, the invention relates to a vehicle cab member 1 which is indicated as a separate unit in the drawings, but which can be attached to any suitable, or conventional type of earth moving vehicles or equipment including dirt haulers, scoops, scrapers and the like. The cab member 1 has a flat sidewall 2 provided thereon, which has an elongate opening 3 therein. Such elongate opening 3 extends substantially the vertical height of the cab member 1 and is used for providing the operator of the vehicle on which the cab member 1 is mounted with freedom of access to and from the cab member. A support shaft 4 is pivotally secured to the sidewall 2 preferably by a connector and/or coupling member (not shown) such as is shown in detail in our co-pending patent application, Serial No. 566,123. The support shaft is journalled in the housing member 4a which is adapted to be adjustably secured to the flat sidewall 2 of the vehicle cab either normally thereto or at a slight deviation from perpendicular relationship so that the cab door can swing in a desired arc with relation to such cab member 1. Such connecting or coupling member permits slight misalignment of the shaft 4 with relation to a line perpendicular to the sidewall 2, but with the cab door, or door means 5 being adapted to be swung or moved in a plane along side of the sidewall 2. Normally this door 5 is secured to the support shaft 4 by means of a metal bar 6 suitably carried by or formed with the shaft 4 and extending across the door 5 on an outer surface thereof. The bar 6 can be welded or otherwise secured to the door 5, as desired. Any suitable windows 7 are provided in the vehicle cab and door 5.

Short straps 8 may also be secured to the door 5 and engage the bar 6 to aid in positioning the bar. A handle 9 is secured to any desired portion of the door or associated means to facilitate movement of the door 5 from the outer surface thereof.

Control of the door 5 from the inner side thereof is provided by means of a short rod or handle 10 secured, as by welding, to the inner surface of the door 5 adjacent the lower front corner thereof, as best shown in Fig. 5. Such rod 10 can be used by the person inside the door for opening or closing the door 5, as desired. Preferably this door 5 lies in a plane lying immediately adjacent the cab member 1 but spaced or offset laterally slightly therefrom. Another feature of the door 5 is that it carries a catch, in the shape of a U-shaped, short, metal member 11 on the inner surface thereof. This member 11 is adapted to engage the rear edge of the opening 3 provided in the sidewall 2, when the door 5 is swung to its rear or open position at which time gravity will retain the door 5 in its given position.

The vehicle cab member 1 at the opening 3 has a top edge 12, a front edge 13, a rear edge 14 and a pair of bottom edges 15 and 16 which are inclined with relation to each other to provide a relatively V-shaped bottom portion for the opening 3 and with which the door 5 is adapted to engage to fill the opening. Thus, in order to provide an air tight and water tight sealing engagement between the adjacent portions of the door and the opening 3, and as a feature of the invention, the door 5 is provided with an offset, downwardly directed channel 17 on the top surface thereof, which channel 17 extends around to the rear edge of the door 5 and is forwardly directed at such portion of the door. This channel 17 is adapted to engage with a complementary shaped channel 18 provided on the top edge 12 of the door and rear edge 14 of the door opening. At such top edge of the door opening, the channel 18 is upwardly directed, whereas at the rear portion of the vehicle cab opening, the channel is faced to the rear so that proper engagement can be had between these channels 17 and 18 as the door 5 is swung through an operative arc for opening or closing the door.

At the front edge 13 of the door opening, an offset, rearwardly directed substantially L-shaped flange 19 is provided which may be welded or otherwise secured to the material forming the cab member 1, or may be integral therewith, if desired. This flange 19 has a base leg 19a and a side leg 19b so that the edge of the door 5 can abut against the base leg 19a of such flange and have the side edge 19b overlie the contact between the flange and door edge for preventing entry of wind or liquid into the vehicle cab at such portion of the door.

Preferably at the bottom portion of the door opening, the bottom edges 15 and 16 of the opening have a flange 20 thereon which has an overturned edge lip 21. To cushion contact of the door with such flange 20, preferably a strip 22 of suitable resilient material, such as rubber or the like, is cemented or otherwise secured in place to reduce rattle and noise from the door 5 when it is closed.

By the various types of flange means described hereinbefore, the door 5 is nicely positioned for pivotal movement and the joints or connections between the door and associated portions of the cab member 1 smoothly interengage and provide a tight closure for such cab member. This door is easily opened and closed and will be retained in a desired position by gravity. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In combination, a cab member having a vertically extending flat side with an opening therein, a door means, a support shaft operatively secured to said cab member on said flat side, means securing said door means to said support shaft to position said door means for upward and rearward pivotal movement from a closed position to expose said opening in said side, said opening in said cab member having top, rear, front and bottom edges, said cab member having an upwardly directed channel provided on the upper edge thereof and a rearwardly directed channel on the rear edge thereof, said door means having a downwardly directed channel on its top edge and a forwardly directed channel on its rear edge for engaging said channels on said cab member when said door means is pivoted forwardly to close said opening, an outwardly and rearwardly extending L-shaped flange on said front edge of said opening, said door means engaging the base of said L-shaped flange with the other leg of such flange extending over the joint formed by the door and flange to make it water and air tight, and flange means on said cab member on the bottom edge thereof for contact with the lower edge of said door means when closed.

2. In combination, a cab member having a vertically extending flat side with an opening therein, a flat door means, a support shaft pivotally secured to said cab member and extending substantially normally from said flat side, a bar secured to said door means and carried by said support shaft to position said door means for upward and rearward pivotal movement to expose said opening in said side, said opening in said cab member having top, rear, front and bottom edges, said cab member having an upwardly directed channel on the upper edge thereof and a rearwardly directed channel on the rear edge thereof, said door means having a downwardly directed channel on its top edge and a forwardly directed channel on its rear edge for engaging said channels on said cab member when said door means is pivoted forwardly to close said opening.

3. In apparatus as in claim 2, an outwardly and rearwardly extending L-shaped flange on said front edge of said opening, said door means engaging the base of said L-shaped flange with the other leg of such flange extending over the joint formed by the door and flange to make it water and air tight.

4. In combination, a cab member having a vertically extending substantially flat side with an opening therein, a relatively flat door means, a support member on said side spaced from the opening therein and extending substantially normally to said side, a support bar secured to said door means and extending beyond the edge of said door means, the extended end of said support bar being carried by said support member to position said door means for pivotal movement substantially in the plane of the door from a position closing said opening to a position exposing at least substantially all of said opening, and complementary flange and channel means provided on peripheral portions of said door means and the opening in the side for engagement when said door means is closed to provide a tight closure.

5. In combination, a cab member for a vehicle, said member having a substantially flat side door opening in a substantially flat side thereof, a relatively flat door for removably closing the opening, means pivotally mounting the door for movement substantially in its own plane to and from closure position, said means including a support positioned on the cab member and protruding therefrom on an axis substantially normal to the side at a point spaced laterally from the door opening and near the lower end thereof, and an arm pivotally positioned by the support and extending from the support to the door and secured thereto to position the door for arcuate movement substantially in a plane defined by the door.

References Cited in the file of this patent

UNITED STATES PATENTS

| 2,565,919 | Hill | Aug. 28, 1951 |
| 2,683,318 | LeTourneau | July 13, 1954 |
| 2,698,060 | Burch | Dec. 28, 1954 |

FOREIGN PATENTS

| 641,943 | Germany | Feb. 18, 1937 |